United States Patent
Brückner et al.

(10) Patent No.: US 9,222,373 B2
(45) Date of Patent: Dec. 29, 2015

(54) METHOD FOR OPERATING A COMBINED GAS AND STEAM TURBINE SYSTEM, GAS AND STEAM TURBINE SYSTEM FOR CARRYING OUT SAID METHOD, AND CORRESPONDING CONTROL DEVICE

(75) Inventors: Jan Brückner, Uttenreuth (DE); Antje Burgemeister, Nürnberg (DE); Frank Thomas, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 161 days.

(21) Appl. No.: 13/878,610

(22) PCT Filed: Oct. 5, 2011

(86) PCT No.: PCT/EP2011/067393
§ 371 (c)(1),
(2), (4) Date: Apr. 10, 2013

(87) PCT Pub. No.: WO2012/049056
PCT Pub. Date: Apr. 19, 2012

(65) Prior Publication Data
US 2013/0192229 A1      Aug. 1, 2013

(30) Foreign Application Priority Data
Oct. 14, 2010   (DE) .......................... 10 2010 042 458

(51) Int. Cl.
*F01K 23/10*   (2006.01)
*F01K 15/00*   (2006.01)
*F22B 35/10*   (2006.01)

(52) U.S. Cl.
CPC ............... *F01K 15/00* (2013.01); *F01K 23/101* (2013.01); *F22B 35/10* (2013.01); *Y02E 20/16* (2013.01)

(58) Field of Classification Search
CPC ............ F01K 23/10; F01K 7/42; F01K 13/02
See application file for complete search history.

(56) References Cited

U.S. PATENT DOCUMENTS

| 5,237,816 | A | * | 8/1993 | Duffy et al. ................. | 60/39.182 |
| 5,529,021 | A |   | 6/1996 | Butterlin |   |
| 6,397,575 | B2 | * | 6/2002 | Tomlinson et al. ............. | 60/783 |

(Continued)

FOREIGN PATENT DOCUMENTS

| CN | 1906441 A | 1/2007 |
| EP | 0507730 A1 | 10/1992 |

(Continued)

*Primary Examiner* — Thomas Denion
*Assistant Examiner* — Shafiq Mian

(57) ABSTRACT

A method of operating a combined gas and steam turbine system is provided. The system includes a gas turbine, a waste heat steam generator with an evaporator heating area, and a steam turbine. Fluid is fed to the waste heat steam generator as feed water. A primary control loop controls a feed water flow rate. Taking into account heat stored in the evaporator heating area, a primary desired value for the feed water flow rate is determined based upon a desired overheating value characteristic of a temperature by which the fluid exceeds a boiling point as the fluid exits the evaporator heating area and based upon a heat flow parameter characteristic of a heat flow transfer from fuel gas to the fluid via the evaporator heating area. The desired overheating value is lowered from a first value to a second value in order to activate an instantaneous power reserve.

14 Claims, 1 Drawing Sheet

(56) References Cited

U.S. PATENT DOCUMENTS

| | | | |
|---|---|---|---|
| 6,598,399 B2 * | 7/2003 | Liebig | 60/772 |
| 6,829,898 B2 * | 12/2004 | Sugishita | 60/772 |
| 6,851,266 B2 * | 2/2005 | Liebig | 60/772 |
| 6,983,585 B2 * | 1/2006 | Hattori et al. | 60/39.182 |
| 7,367,192 B2 * | 5/2008 | Hattori et al. | 60/772 |
| 2006/0162315 A1 * | 7/2006 | Bruckner et al. | 60/39.182 |
| 2007/0204623 A1 * | 9/2007 | Rollins, III | 60/772 |
| 2010/0077970 A1 * | 4/2010 | Kumar et al. | 122/479.1 |
| 2010/0089024 A1 * | 4/2010 | Bruckner et al. | 60/39.182 |
| 2011/0023487 A1 * | 2/2011 | Olia | 60/653 |

FOREIGN PATENT DOCUMENTS

| | | |
|---|---|---|
| EP | 2065641 A2 | 6/2009 |
| EP | 2224164 A1 | 9/2010 |
| JP | S6490902 A | 4/1989 |
| JP | 2006125760 A | 5/2006 |
| JP | 2008032367 A | 2/2008 |
| WO | WO 2006005708 A1 | 1/2006 |
| WO | WO 2009150055 A2 | 12/2009 |

\* cited by examiner

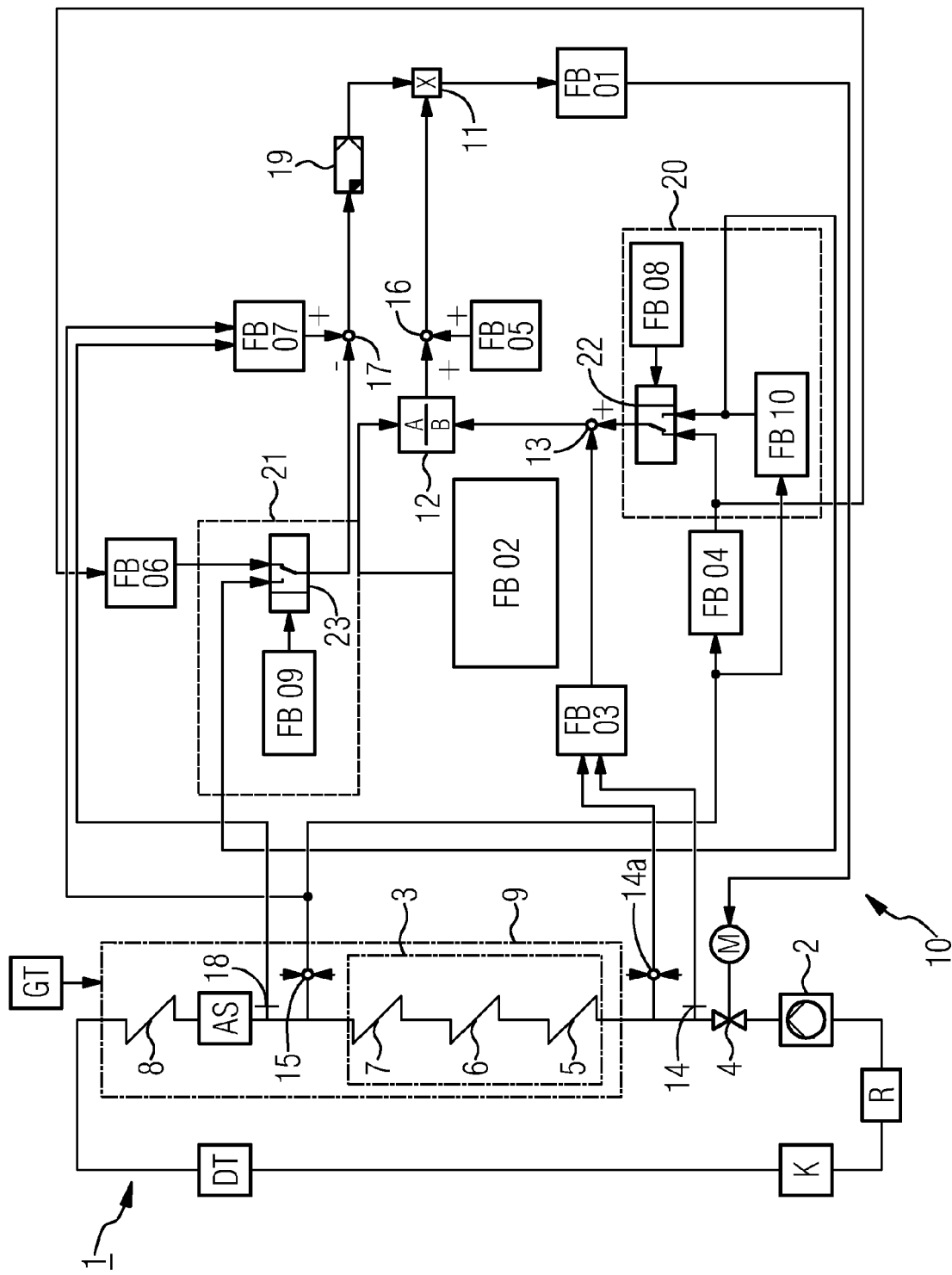

METHOD FOR OPERATING A COMBINED GAS AND STEAM TURBINE SYSTEM, GAS AND STEAM TURBINE SYSTEM FOR CARRYING OUT SAID METHOD, AND CORRESPONDING CONTROL DEVICE

CROSS REFERENCE TO RELATED APPLICATIONS

This application is the U.S. National Stage of International Application No. PCT/EP2011/067393 filed Oct. 5, 2011, and claims the benefit thereof. The International Application claims the benefits of German Application No. 10 2010 042 458.7 DE filed Oct. 14, 2010. All of the applications are incorporated by reference herein in their entirety.

FIELD OF INVENTION

The invention relates to a method for operating a combined gas and steam turbine system comprising a gas turbine and a waste heat steam generator which is located downstream of the gas turbine in the direction of flow of the exhaust gas or fuel gas. The invention also relates to a gas and steam turbine system arranged to carrying the method and to a corresponding control device.

BACKGROUND OF INVENTION

A waste heat steam generator is a heat exchanger which recovers heat from a hot flow of gas. Waste heat steam generators are used inter alia in gas and steam turbine systems (CCGT systems) which are predominantly used for generating power. A modern CCGT system conventionally comprises one to four gas turbines and at least one steam turbine, wherein either each turbine drives one generator respectively (multi-shaft system) or one gas turbine, together with the steam turbine on a shared shaft, drives a single generator (single-shaft system). The hot exhaust gases from the gas turbine(s) are used in the waste heat steam generator to generate steam. The steam is then fed to the steam turbine. Approximately two thirds of the electrical power are typically allocated to the gas turbine and one third to the steam turbine.

It should be mentioned for the sake of completeness at this point that basically different substances can be used as the moving fluid for the waste heat steam generator and the steam turbine. Reference will be made below by way of example to the use of water or water vapor since this is by far the most common moving fluid.

Analogously to the various pressure stages of a steam turbine, the waste heat steam generator conventionally also comprises a plurality of pressure stages with, during normal operation, different thermodynamic states of the water-steam mixture contained in each case. In the feed water or steam circuit the moving fluid passes in the course of its flow path firstly through an economizer in which residual heat in the exhaust gas stream is used to pre-heat the moving fluid. What is known as an evaporator adjoins the economizer and can preferably be constructed as a forced flow evaporator and in particular as what is known as a BENSON evaporator. The moving fluid is then in the form of steam or a water-steam mixture at the evaporator outlet, wherein possible residual moisture is separated in a separator positioned at this location. The onwardly-conveyed steam is consequently heated further in a superheater. The overheated steam then flows into the high pressure part of the steam turbine, expands there and is fed to the subsequent pressure stage in the steam generator. There it is overheated again and then introduced into the next pressure stage in the steam turbine. Adjoining the steam turbine outlet is a condenser in which the expanded steam is condensed and fed as feed water to a reservoir. A feed water pump finally conveys the feed water from the reservoir into the economizer again. The feed water flow rate is controlled by a control valve located downstream of the feed water pump.

The feed water flow rate in the feed water circuit, and in particular in the evaporator, is controlled as a function of the operating state of the waste heat steam generator and, connected therewith, of the current steam generator power. In the case of changes in load the evaporator flow-through should be changed as synchronously as possible to the heat introduction into the heating areas of the evaporator because, otherwise, a difference in the specific enthalpy of the moving fluid at the outlet of the evaporator from a desired value cannot be reliably avoided. Such an undesired difference in the specific enthalpy makes control of the temperature of the live steam issuing from the steam generator difficult and leads, moreover, to high material stresses and therewith to a reduced life of the steam generator.

To keep such differences in the specific enthalpy from the desired value, and, resulting therefrom, undesirably high temperature variations, as low as possible in all operating states of the steam generator, i.e. in particular in transient states or in the case of changes in load as well, the feed water flow controller can be constructed in the manner of what is known as a predictive or anticipatory design. The required feed water flow rate desired values should be provided as a function of the current operating state or for the operating state expected next, in particular in the case of changes in load as well. A control system which is very expedient in this respect is described in the unexamined and first European publications EP 2 065 641 A2 and EP 2 194 320 A1 which can both be attributed to the Applicants. Explicit reference is made to the entire disclosure of these documents.

An optimally flexible mode of operation is required of modern power stations in addition to a high level of efficiency. This includes the option of compensating frequency disruptions in the electric grid in addition to short start-up times and high load-change speeds. To satisfy these requirements the power station must be capable of providing increased outputs of, by way of example, 5% and more within a few seconds.

This is usually achieved in previously conventional CCGT power stations by increasing the load of the gas turbine. Under certain circumstances, however, it may be possible, in particular in the upper load range, that the desired increase in power cannot be provided solely, or cannot be provided quickly enough, by the gas turbine. Solutions are in the meantime also being pursued in which the steam turbine can and should also make a contribution to frequency stability, and primarily in the first few seconds following a power requirement.

This can occur by way of example by opening partially throttled turbine valves in the steam turbine or what is known as a stage valve, whereby the steam pressure upstream of the steam turbine is reduced. Steam from the steam accumulator of the waste heat steam generator located upstream is consequently withdrawn and fed to the steam turbine. A power increase is attained in the CCGT power station within a few seconds by way of this measure.

This additional power can be released in a relatively short time, so the delayed power increase can be at least partially compensated by the gas turbine (limited by its construction- and operation-related maximum load-change speed). As a result of this measure the entire power station block makes an immediate leap in power and as a result of a subsequent power increase in the gas turbine can also lastingly maintain this power level or even exceed it provided the system was in the partial load range at the time of the additionally required power reserves.

Permanent throttling of the turbine valves to provide a reserve always leads to a loss in efficiency, however, so for economic operation the degree of throttling should be kept as low as is absolutely necessary. Furthermore, some waste heat steam generator designs, thus for example forced flow steam generators, sometimes have a significantly lower storage volume than for example natural circulation steam generators.

In the method described above the difference in the size of the reservoir has an effect on the behavior of the steam turbine of the CCGT power station in the case of changes in power.

SUMMARY OF INVENTION

It is an object to disclose a method for operating a gas and steam turbine system comprising a waste heat steam generator of the type mentioned above in which an instantaneous power reserve can be released as required, and in which the normal operational efficiency of the system is not unduly affected. At the same time the fast increase in power should be enabled without significant invasive constructional modifications to the overall system independently of the design of the waste heat steam generator. A further object is to disclose a gas and steam turbine system which is particularly suitable for carrying out the method, and a corresponding control device.

The object based on the method is achieved according to the independent method claim. The dependent claims include partially advantageous and partially independently inventive developments of the method.

The starting point for the development of the inventive method is the consideration to temporarily increase the feed water flow through the evaporator. As a result of this measure thermal energy is withdrawn from the evaporator and the subsequent superheater heating areas and discharged in the steam turbine in the form of additional power.

As one possibility of achieving this it can in principle be contemplated to simply switchover from what is known as the "BENSON control mode", which is preferred for standard or normal operation owing to a high level of efficiency, into what is known as "level control mode".

Put simply, in "level control mode" the evaporator is permanently over-supplied with feed water, i.e. is actually overfed. The resulting increased amount of feed water which has not yet evaporated must then be separated from the steam in a separator located downstream. In this way the increase in the feed water flow rate can indeed be effectively fulfilled in order to provide additional power, but under said conditions undesirable residual water collects at the evaporator outlet. Furthermore, current feed water control concepts are designed in such a way that during the switchover process between two operating modes there is no abrupt correction of the parameters. Instead a gradual and therewith relatively time-intensive transfer between two dynamic system states is conventionally provided.

In the "BENSON control mode" by contrast an attempt is made to convey precisely the amount of feed water through the evaporator via predictive control that the water is as completely converted as possible into live steam in a certain thermodynamic state. What is known as a desired overheating value is predefined at the evaporator outlet in this connection. The temperature of the steam at said outlet should accordingly lie above the boiling temperature of the medium by a desired difference. A parameter is firstly determined in this respect which characterizes the heat flow in the evaporator. The thermal energy available to the feed water results from taking into account the heat temporarily stored in the components of the evaporator. From this the amount of feed water can in turn be calculated which can be converted into steam with the aid of the supply of heat with a temperature rise as specified. Finally, appropriate control of the control valve located downstream of the feed water pump ensures that the primary desired value calculated in this way is established for the feed water flow rate.

For the inventive release of an instantaneous power reserve the desired overheating value is lowered from a normal value defined for the standard operation of the gas and steam turbine system at a comparatively high efficiency to a smaller activation value. This results in an increase in the feed water flow rate through the control system. With an approximately constant thermal supply of flue gas this results in an immediate reduction in overheating with respect to the temperature of the moving fluid at the evaporator outlet. In conclusion the material temperatures of the affected heating areas, i.e. of the evaporator and superheater located downstream, are also reduced. As a consequence of this reduction in the material temperature thermal energy is finally withdrawn from the heating areas of the evaporator and the superheater owing to the increased flow of the medium at reduced medium temperature and is discharged in the steam turbine in the form of additional power.

It is deemed to be advantageous in this connection if a switchover is made abruptly and rapidly between the two desired overheating values, and preferably with a switching time of a maximum of one second or less. In this way the instantaneous power reserve should be available in as short a time as possible in response to frequency disruptions in the electric grid.

Because the level of the instantaneous power reserve increases as the activation value decreases, it is also advantageous for the temperature rise to select a value close to the boiling temperature of the medium. At the same time too great an approximation of the boiling temperature has proven to be disadvantageous since in this case an increased amount of undesirable residual water can collect at the evaporator outlet.

In this connection a temperature rise with respect to the boiling temperature of the medium of between 5 k and 15 k is regarded as a sensible compromise in this respect as an activation value.

For the benefit of a more accurate specification of the thermodynamic state of the live seam it is provided in a further improved variant of the method that the boiling point is determined indirectly by way of a preferably permanent pressure measurement at the evaporator inlet or outlet instead of being stored in a memory as a fixed value.

In a version of the method which is also very expedient the primary desired value for the feed water flow rate is calculated by generating the quotient. In this connection the heat flow parameter, which characterizes the heat flow transferred from the flue gas to the evaporator, is provided as the numerator by taking into account the heat temporarily stored in the components of the evaporator. The denominator is in turn formed from the difference between a desired enthalpy value of the medium at the evaporator outlet, characterized by the corresponding desired overheating value and by the pressure measured at the evaporator outlet, and the determined enthalpy of the medium at the evaporator inlet, which, in turn, can be determined by a corresponding temperature and pressure measurement. A basic desired value of the feed water flow rate is therefore given which in the controlled state of the system also ideally lastingly creates the required desired values. By definition this is regarded as the 100% state or initial state of the corresponding loading condition. This applies irrespective of whether the system comprising waste heat steam generator and steam turbine is in partial load or full load operation. The overall control system, which typically operates particularly effectively in a limited value range, is always kept exactly in this value range hereby.

According to a preferred control system for implementing the inventive method a second control loop which works in parallel is provided in addition to the predictive control loop. With the aid of this second control loop a secondary desired value is determined for the feed water flow rate. A difference is then formed from the determined enthalpy of the medium at the evaporator outlet and the corresponding desired enthalpy value specification. The secondary desired value is used more or less as a correction value which is intended to further increase the accuracy of control and in cases in which the primary desired value has high errors or varies due to the system, intervenes in a correctional or stabilizing manner.

In particular when using a correction control device with which the secondary desired value is converted into an adapted relative variable, it is particularly expedient in this context to multiplicatively link together both desired values for the feed water flow rate. The effect of absolute variables on the control system can be reduced further thereby.

Alternatively, to specify the desired overheating value, i.e. a temperature, a desired enthalpy value may also be specified in the control system which is either determined by way of characteristic variables or determinatively acts on these. In each case the change between the associated normal value and the associated activation value should cause the heat supply to be redistributed to a greater amount of feed water.

When returning the system to standard operation it may be advantageous to not switch rapidly back from the activation value to the normal value but to reduce the value continuously and therefore with a delay. This can occur by way of example synchronously with the increase in the power of the gas turbine if a continuous power of the entire power station is desired during this time. For this purpose the control device can be fitted at a suitable location with appropriate delay members.

The method described here for operating a waste heat steam generator and a steam turbine located downstream, with the option of liberating an instantaneous power reserve in the meantime, is preferably used in a combined gas and steam turbine system. Here this instantaneous power reserve is primarily used as a rapidly available power buffer since the additional power can be released in a relatively short time. With the aid of the power buffer a limited period can be bridged which is sufficient to at least partially compensate the delayed power increase by the gas turbine (limited by its construction- and operation-related maximum load-change speed). As a result of this measure the entire power station block makes an immediate power leap and can also lastingly maintain, or even exceed, this power level due to the simultaneously initiated power increase of the gas turbine.

To conclude it should be noted that the inventive method can also be achieved without invasive constructional measures. It can be put into place solely by an implementation of additional components in the control system. Greater system flexibility and greater system benefits are therefore achieved without additional costs.

Furthermore, the method is independent of other measures, so even throttled turbine valves by way of example may be opened as well in order to further intensify the power increase of the steam turbine. The injection flow rates of injection coolers, or similar with the same regulatory goal, provided in the waste heat steam generator can be simultaneously controlled, moreover. The effectiveness of the method is for the most part unaffected by these parallel measures.

BRIEF DESCRIPTION OF THE DRAWINGS

An exemplary embodiment of the invention will be illustrated in more detail below with the aid of a block diagram. The FIGURE shows in the manner of a block diagram a schematic view of a gas and steam turbine system with an associated control system.

DETAILED DESCRIPTION OF INVENTION

The inventive method is used in the exemplary embodiment to operate a combined gas and steam turbine system (CCGT system). For the sake of clarity a steam turbine DT with just one pressure stage is being considered here. An expansion to a plurality of pressure stages and corresponding intermediate overheating stages is possible without difficulty in this connection for the person skilled in the art.

The steam turbine DT of the CCGT system is incorporated in a feed water circuit 1. Starting from a feed water reservoir R the feed water is conveyed by means of the pump 2 into a forced flow evaporator 3. As a rule an economizer (not shown here) for pre-heating the feed water is located upstream of the evaporator. The feed water flow rate in the forced flow evaporator 3 can be varied by a control valve 4, whose valve position is adjusted by an associated servo motor M. A plurality of heating areas is provided in the forced flow evaporator 3, hereinafter also called an evaporator 3 for short. Due to their construction these can be called economizer 5, evaporator 6 and superheater heating areas 7 in accordance with their sequence in the feed water circuit 1. At the evaporator outlet the feed water is in the form of having been transferred into its gas phase and as steam is heated further with the aid of superheater heating areas 8 located downstream. A separator AS is also located between evaporator 3 and superheater heating areas 8, and, if required, separates undesirable residual water from the steam. The overheated steam is used solely to obtain electrical power in a steam turbine DT and condenses in a condenser K located downstream back to feed water which is returned to the feed water reservoir R. All heating areas of the feed water circuit 1 are arranged in a hot has channel 9. The exhaust gases from a gas turbine GT are introduced into this hot gas channel 9. These gases firstly overflow over the superheaters 7, 8, then the evaporator 6 and finally the economizer heating areas 5 and, if present, the heating areas of the economizer. In this way a waste heat steam generator is achieved with which, as a consequence of combination with the steam turbine DT, the heat stored in the exhaust gases from the gas turbine GT can be at least partially used to obtain electrical energy.

To ensure an optimally high level of efficiency the feed water flow rate in the feed water circuit 1 must be controlled and adapted to possible variations in the hot gas feed through the gas turbine GT. A corresponding control system 10 is provided for this purpose which controls the servo motor M and adjusts the position of the control valve 4 thereby.

Said control system 10 is substantially constructed from what are known as functional modules FB 01 . . . FB 10. These units can process measuring signals, access data which is stored in a memory and convert these signals or this data by way of logical operations into functional values which are then either passed on to further functional modules FB 01 . . . FB 10 or are used as command codes to control devices, such as the servo motor M, located downstream. In the exemplary embodiment the control commands are generated for the servo motor M by the functional module FB 01. Two desired values determined by two control loops working in parallel are used as the data basis or input signals and these values are linked to each other by a multiplying element 11.

One of the two control loops is designed as what is known as a predictive or anticipatory control loop. Using this control loop, which is hereinafter called a primary loop, it is to be calculated in advance by taking into account the system reaction times at which feed water flow rate, basically reliable operation with, moreover, a particularly high level of efficiency can be achieved in a subsequent time interval. The associated variable, which in terms of its dimension represents a flow rate, is called the primary desired value and in that subsequent time interval corresponds to the first of the two desired values which are linked to each other by the multiplying element 11.

To determine the primary desired value two variables A and B are compared on a dividing element 12. Variable A, determined by a functional module FB 02, represents the heat supply available to the medium water, i.e. the heat withdrawn from and fed into the evaporator 3 from the exhaust gas of the gas turbine GT minus the amounts temporarily stored in the heating areas of the evaporator 5, 6, 7. It is precisely this heat supply which should be used to bring about a certain change in enthalpy B in the medium in the evaporator 3. That change in enthalpy B is produced by establishing the difference on the adding element 13 between the desired enthalpy value of the medium at the evaporator outlet and the enthalpy value of the medium at the evaporator inlet. The enthalpy vale of the medium at the evaporator inlet is regarded as given but variable in this calculation and is determined by a functional module FB 03 which accesses the measuring signals of a temperature sensor 14 and a pressure sensor 14a. On the other hand the thermodynamic state of the medium, and consequently also the enthalpy value at the evaporator outlet, are also to be specified. A desired overheating value is stored in the functional module FB 04 for this purpose. The temperature of the steam at the evaporator outlet should accordingly lie above the boiling temperature of the medium by a specified amount, the normal value, and the boiling temperature is for its part determined with the aid of the data from a pressure sensor 15 at the evaporator outlet. The desired enthalpy value of the medium at the evaporator outlet that follows from this is fed to the subtracting element 13 from the functional module FB 04.

When calculating the primary desired value even more variables, including representative variables for the dynamic effects, can be taken into consideration, moreover. A corresponding correction term is determined by a functional module FB 05 and then added to an adding element 16 located downstream of the dividing element 12.

The second control loop, which is also called a secondary loop, is constructed as a reactive control loop and is intended to further increase the accuracy of the entire control system by a type of fine tuning. This occurs with the aid of a desired value-actual value comparison on a subtracting element 17. The desired enthalpy value of the medium at the evaporator outlet, calculated by the functional module FB 04, is fed as the desired value to the subtracting element 17 by the functional module FB 06. The associated enthalpy value is based on the measuring signals of a temperature sensor 18 and the pressure sensor 15 at the evaporator outlet and is determined by a functional module FB 07. The desired value-actual value difference determined from this is finally fed to a PI control element 19 which provides the second desired value or secondary desired value for the multiplying element 11 at the output. This desired value is a dimensionless relative variable which, irrespective of whether the combined power station is in full load or partial load mode, lies close to the value 1. Since the components of a control loop only work particularly effectively in a limited value range it can be ensured by reference to a relative variable of this kind that, irrespective of absolute variables, the expected value range largely matches the value range advantageous in relation to the components.

To release an instantaneous power reserve, according to the invention the desired overheating value is lowered from a normal value defined for the stationary operation of the gas and steam turbine system at a comparatively high efficiency to a smaller activation value. This desired value reduction acts on both the primary and secondary circuits of the control system 10. The regions of the system affected by this are emphasized by the markings 20 and 21.

The change in the desired overheating value is implemented rapidly by way of example in the exemplary embodiment. This change can therefore be brought about by flipping a switch 22, 23 in each control loop. Each switch is controlled by an associated functional module FB 08, FB 09, wherein the two switches 22, 23 are substantially switched over at the same time. An embodiment without the switches 22, 23 is also possible as an alternative. In this case the functional modules FB 08, FB 09 assume a more complex function. Instead of simply switching between two values the functional modules FB 08, FB 09 independently specify an adjusted desired overheating value, which lies in a stored value range, as a function of a measured frequency disruption.

The reduction in the desired overheating value is accompanied by a reduction in the desired enthalpy value of the medium at the evaporator outlet. The desired enthalpy value based on the activation value is calculated by an additional functional module FB 10. During the activation phase of the instantaneous power reserve this desired enthalpy value replaces the desired enthalpy value pertaining to the normal value both at the subtracting element 17 of the secondary circuit and at the subtracting element 13 of the primary circuit 13.

As a consequence the feed water flow rate in the evaporator 3 increases, and therewith the feed water flow through it. With this measure thermal energy is withdrawn from the evaporator 3 and the subsequent overheating heating areas owing to the greater flow with comparatively lower medium temperatures and is discharged in the steam turbine DT in the form of additional power.

The invention claimed is:

1. A method for operating a combined gas and steam turbine system, comprising a gas turbine, a waste heat steam generator which is located downstream of the gas turbine in direction of flow of exhaust gas of the gas turbine and includes at least one evaporator through which a moving fluid flows, and a steam turbine which is located downstream of the waste heat steam generator in direction of flow of the moving fluid, the moving fluid is fed to the waste heat steam generator in the form of feed water, the method comprising:

providing a primary control loop for a predictive control of a feed water flow rate, determining, taking into account heat stored in components of the at least one evaporator, a primary desired value for the feed water flow rate based upon a desired overheating value that is characteristic of a temperature by which the moving fluid exceeds a boiling point as the moving fluid outlets the evaporator and based upon a heat flow parameter that is characteristic of a heat flow transferred from the exhaust gas to the moving fluid via the at least one evaporator, adjusting the feed water flow rate according to the primary desired value, and lowering the desired overheating value from a normal value defined for a stationary operation of the combined gas and steam turbine system at a comparatively high efficiency to a smaller activation value in order to activate a temporarily available instantaneous power reserve, wherein the comparatively high efficiency is at least an increased power output of 5% of the combined gas and steam turbine system, and wherein the smaller activation value is less than the normal value after the lowering.

2. The method as claimed in claim 1, wherein the lowering is made abruptly and rapidly.

3. The method as claimed in claim 1, wherein the smaller activation value is chosen such that a temperature rise remains positive during an activation phase.

4. The method as claimed in claim 3, wherein the temperature rise is between 5 K and 15 K during an activation phase.

5. The method as claimed in claim 4, wherein a further temperature rise is at least 30 K during normal operation preceding the activation phase.

6. The method as claimed in claim 1, wherein a boiling temperature of the moving fluid at an outlet of the at least one evaporator is determined with the aid of a pressure of the moving fluid.

7. The method as claimed in claim 1, wherein a quotient is formed from a heat flow parameter and an enthalpy differential value characteristic of an increase in enthalpy of the moving fluid in the at least one evaporator in order to determine the primary desired value for the feed water flow rate, and wherein the enthalpy differential value characteristic is determined with the aid of the desired overheating value converted into a desired enthalpy value and a measured enthalpy of the moving fluid at an inlet of the at least one evaporator.

8. The method as claimed in claim 1, wherein a secondary desired value for the feed water flow rate is determined by a secondary control loop by comparing a measured enthalpy of the moving fluid at an outlet of the at least one evaporator with a desired predefined enthalpy value, and wherein the feed water flow rate is adjusted based upon a total desired value formed from the primary desired value and the secondary desired value.

9. The method as claimed in claim 8, wherein the primary desired value and the secondary desired value are multiplied by each other to form the total desired value.

10. The method as claimed in claim 8, wherein, during an activation phase, the desired enthalpy value is switched over from a starting value defined for the stationary operation of the gas and steam turbine system at the comparatively high efficiency to the smaller activation value.

11. The method as claimed in claim 10, wherein the desired enthalpy value is switched over simultaneously with the desired temperature value.

12. The method as claimed in claim 1, wherein, at an end of an activation phase, the system returns to normal operation continuously with a delay from the activation value to the normal value.

13. A combined gas and steam turbine system, comprising: a gas turbine, a waste heat steam generator which is located downstream of the gas turbine in direction of flow of exhaust gas and includes at least one evaporator through which a moving fluid flows, the waste heat steam generator further comprising a feed water intake, which is adjusted by way of a control valve, a steam turbine which is located downstream of the waste heat steam generator in direction of flow of the moving fluid, and a control device for controlling a feed water flow rate which is configured to execute a method comprising:

providing a primary control loop for a predictive control of a feed water flow rate, determining, taking into account heat stored in components of the at least one evaporator, a primary desired value for the feed water flow rate based upon a desired overheating value that is characteristic of a temperature by which the moving fluid exceeds a boiling point as the moving fluid outlets the evaporator and based upon a heat flow parameter that is characteristic of a heat flow transferred from the exhaust gas to the moving fluid via the at least one evaporator, adjusting the feed water flow rate according to the primary desired value, and lowering the desired overheating value from a normal value defined for a stationary operation of the combined gas and stream turbine system at a comparatively high efficiency to a smaller activation value in order to activate a temporarily available instantaneous power reserve, wherein the comparatively high efficiency is at least and increased power output of 5% of the combined gas and steam turbine system, and wherein the smaller activation value is less than the normal value after the lowering.

14. A control device for a combined gas and steam turbine system, wherein the control device is configured to execute a method as claimed in claim 1.

* * * * *